United States Patent Office 2,776,949
Patented Jan. 8, 1957

2,776,949

MODIFIED AMIDE-ALDEHYDE RESINS FROM AMIDES OF OXIDIZED PARAFFIN ACIDS

John P. Buckmann, Yorba Linda, Calif., assignor to Union Oil Company of California, Los Angeles, Calif., a corporation of California No Drawing. Application July 27, 1953,
Serial No. 370,630

12 Claims. (Cl. 260—72)

This invention relates to synthetic resinous products suitable for use as varnish bases, enamel bases, adhesives and the like. More particularly the invention relates to alcohol modified amide-aldehyde resins wherein the amides are prepared from a particular fraction of acids, recoverable from paraffin wax which has been oxidized in a specific manner and to a particular degree.

It has been found that acid amides prepared by amidating a particular acidic fraction recoverable from oxidized paraffin wax, which wax has been oxidized in a certain manner and to a definite degree when condensed with formaldehyde or acetaldehyde or compounds which decompose to furnish such aldehydes, all of which compounds will be referred to herein as aldehyde substances, in the presence of a monohydroxy alcohol, as specifically designated hereinbelow, produce resins which are soluble in ordinary paint and varnish thinners or solvents, and which when applied to metal, glass, wood, leather or other surfaces, and cured or baked, produce films which are exceedingly adherent, very flexible, abrasion resistant and resistant to all ordinary solvents. It is also found that following the condensation in the presence of a monohydroxy alcohol as indicated above substantially complete removal of solvent and heating produce a resin which though still somewhat soluble in powerful ketonic solvents and their mixtures with alcohols and esters, is substantially insoluble in the lower alcohols and in the normal paint and varnish thinners, as for example, hydrocarbon solvents, turpentine and the like. The resin at this stage, which will be referred to herein as the B stage, ranges in viscosity from a viscous liquid to a material which is only slightly fluid and in this form appears to have excellent adhesive and/or glue-like properties, making it particularly suitable for use in the preparation of wood, metal, glass and other laminates. The full strength of the resin is obtained by pressing and heating the laminated product to obtain the desired curing.

The particular value of the resins of this invention over those which are known is in the tenacity of films produced by these resins and in the flexibility and resistance to abrasion, solvents, and the like, exhibited by these resins and films. Furthermore, these resins are prepared from relatively low cost raw materials, the amides being prepared from acids recovered in good yields from paraffin wax following a simple air-blowing operation.

It is an object of this invention to prepare a synthetic resinous material particularly suitable for use as a varnish, enamel or paint base or for the preparation of adhesives.

Another object of this invention is to prepare a synthetic resinous material having properties making it particularly suitable for use in the preparation of protective coatings and in the preparation of laminated products, which synthetic resin is manufactured from relatively cheap raw materials.

A more specific object of this invention is to prepare a synthetic resinous material from acids produced by oxidizing paraffin wax by amidating the acids and condensing the acids with an aldehyde substance in the presence of a monohydric alcohol, which resin has properties making it particularly suitable for use as a resin base for varnishes, enamels, paints and the like, and as an adhesive.

These objects are accomplished by oxidizing paraffin wax, separating a useful fraction of acids from the oxidate, amidating the acids and condensing the amides with aldehyde in the presence of an alcohol as particularly described hereinbelow.

The acids useful in preparing the amides for subsequent condensations are prepared by oxidizing paraffin wax such as a refined or deoiled paraffin wax having a melting point between about 43° C. and 95° C., and preferably between about 55° C. and 80° C. The oxidation is effected by heating the wax to a temperature between about 100° C. and 140° C. at a pressure between about normal atmospheric pressure and about 20 atmospheres pressure and blowing the melted wax with air or other gas containing free oxygen, e. g., oxygen, oxygen enriched air, etc., until the acid number of the product is between 200 and 350 mg. KOH/g. Following the oxidation, the crude oxidized wax is extracted with water to remove water-soluble oxidation products including low molecular weight fatty acids, low molecular weight dicarboxylic acids and other low molecular weight water-soluble partial oxidation products, and subsequently extracted with a light petroleum naphtha, thinner or hydrocarbon solvent, such as pentane, hexane or heptane or a hydrocarbon fraction containing one or more of these hydrocarbons, to remove naphtha-soluble components of the oxidized mixture. This treatment removes fatty acids, unoxidized wax and partial oxidation products such as alcohols, ketones and the like. The resulting water-insoluble, naphtha-insoluble fraction is the acid fraction which is useful in preparing the amides suitable for use in the preparation of the resins of this invention.

It is essential that the oxidation be carried to the degree indicated, i. e., until the acid number of the oxidized product is within the range indicated in order to produce a water-insoluble, naphtha-insoluble fraction having the desired characteristics. It is found that if the acid number of the oxidized wax is below about 200 mg. KOH/g., only small amounts of a water-insoluble, naphtha-insoluble fraction is recovered and that this fraction does not have all of the desirable characteristics which are to be found in the corresponding fraction recovered from a wax oxidate having an acid number within the range of 200 to 350 mg. KOH/g. Moreover, it is found that if the oxidation is carried to such an extent that the oxidized wax has an acid number appreciably above 350, as for example, 400 to 500 or above, the product becomes primarily water-soluble and the water-soluble acids are not satisfactory for use in preparing the synthetic resins of this invention. It is believed that when the oxidation is carried to a point below that indicated to be desirable, the major proportion of acids produced are monocarboxylic acids of the fatty acid type. Under any circumstance these acids are not useful in preparing the amides and the condensation products described herein. Moreover, it is believed that when the oxidation is carried beyond the point indicated to be desirable, the product contains large proportions of dicarboxylic acids and possibly more highly oxidized materials which are again not suitable for the preparation of amides which are useful in preparing the condensation products of this invention.

The fraction referred to hereinafter as the water-insoluble, naptha-insoluble fraction is the fraction recoverable from oxidized paraffin wax of 200 to 350 acid number. This fraction has an acid number between about 140 and about 200 mg. KOH/g., a saponification number-acid number ratio usually between about 1.6 and 2.2 to 1, although the ratio is sometimes as low as 1.4 to 1, and a ratio of total oxygen to carboxyl oxygen, i. e. oxygen contained in —COOH groups or in —COOR groups between about 1.4 and 1.6 to 1, although this ratio may vary depending upon the conditions and extent of oxidation between 1.2 and 1.8 to 1. The fraction must be identified in this manner since because of the complexity of the mixture of acids present it is not possible to define the acids present by structure. It is believed that the major proportion of the acids present are hydroxy carboxylic acids, ester acids and the like containing from about 6 to about 60 carbon atoms per molecule, however, it is the mixture of acids produced and separated in the manner described which applicant finds useful in preparing the amides which are condensed with an aldehyde to give the resins of this invention.

It is to be noted further that the method of oxidation appears to be critical. Thus, acids produced by oxidation with nitric acid and other chemical oxidizing agents of this type have not produced resins of the character and quality of those prepared from the acids obtained in the manner described herein.

It is recognized that acids having the characteristics described hereabove are present in the oxidized mixture obtained as described herein and that extraction with water and with naphtha to obtain the particular water-insoluble, naphtha-insoluble fraction described is but one method of obtaining the segregation of acids of this character. Other methods may be employed and such other methods include extraction of the water-washed oxidized wax with aqueous solutions or slurries of an alkali metal borate such as sodium borate. In such cases the water-washed oxidized wax is extracted with a sufficient amount of the metal borate solution or slurry to produce complexes with the acids which it is desired to separate, i. e., the so-called naphtha-insoluble acids. After extraction the borate phase containing the desired acids is acidified with mineral acid to release the organic acids. This extraction with borax is generally effected at temperatures between 20° C. and 100° C. and preferably, before extraction, the water-washed oxidized wax is mixed with 1 to 10 volumes of a hydrocarbon solvent such as naphtha.

Other methods of separating the desirable fraction from the water-washed oxidized wax include fractional solution in sulfuric acid or fractional precipitation from sulfuric acid. In the former method the water-washed oxidized wax is repeatedly contacted with progressively increasing concentrations of sulfuric acid starting with about 65% acid and finally extracting with about 95% acid. In such an extraction process it is found that the desirable acid fraction referred to herein as the naphtha-insoluble acid fraction is obtained with 70% to 75% sulfuric acid. The first extraction with 65% acid appears to remove water remaining from the water washing operation, together with normally water-soluble acidic materials and the final extractions, i. e., with acid concentrations of 80 to 90 or 95% concentration of sulfuric acid, result in the separation of acids which are normally soluble in petroleum naphtha. In such cases it is the intermediate fractions that are desirably separated for use in the preparation of amides.

Following the second method, i. e., fractional precipitation from sulfuric acid, the water-washed oxidized wax is contacted with 90% to 95% sulfuric acid to dissolve substantially all of the acids present and, after separation of unreacted wax and neutral oxygenated compounds from the sulfuric acid solution, the fraction comprising sulfuric acid and dissolved acidic constituents is diluted with water, the water being added in increments. In such case the first materials to be precipitated are the neutral oxygenated constituents and the fatty or naptha-soluble acids. Following the precipitation of these materials the fraction of acids corresponding to the naphtha-insoluble acids are precipitated by further dilution. It is to be noted that acetic acid may be used in place of sulfuric acid in the above fractionation process.

Various procedures can be employed according to this invention to amidate the oxidized paraffin wax or a fraction thereof to produce amides having the desirable characteristics described herein.

In the preferred method the fraction referred to herein as the water-insoluble, naphtha-insoluble fraction, is heated to a temperature between about 50° C. and 150° C. and ammonia gas is bubbled into the mass. The reaction with ammonia is continued until no further water is evolved, requiring generally between about 0.5 and 24 hours. During the heating and blowing with ammonia gas the temperature is gradually increased and the amidation is completed at a temperature between about 150° C. and 250° C., preferably about 180° C.

The amidation may also be caused to occur under pressure, or with various catalysts, such as the ammonium halides, activated clays, silica gel and the like. It is most convenient to remove the water of reaction from the zone of reaction; excess ammonia may then be separated and recycled or used in some other process as desired. The resulting product ranges from substantially neutral, i. e., substantially all of the acid groups having been converted to amide groups during the treatment, to a product having an appreciable acid content as discussed hereinbelow. Usually the resulting product will contain between about 3% and 7 or 8% of amido nitrogen and between 0.2% and 2% of amino nitrogen as indicated by determining total nitrogen using either the well known Kjeldahl or micro-Dumas nitrogen determination and determining the amino nitrogen by the method of Van Slyke, also well known. The amido nitrogen content is obtained by difference.

As a modification of the preferred method the oxidized wax or fraction thereof is converted to the ammonium salt or soap in any of several ways, i. e., by reaction with ammonium hydroxide or by forming the sodium soap or salt by treatment with caustic alkali and the resulting sodium compound is metathesized with ammonium chloride. The resulting ammonium compound is heated to a temperature between about 150° C. and about 220° C. to effect dehydration and conversion of the ammonium compound to the corresponding amide.

Another method of preparing the amides is to prepare the sodium salt or soap of the oxidized wax or fraction thereof and heat the dry sodium compound with dry ammonium chloride at temperatures between about 150° C. and 450° C. During the heating, water and sodium chloride are formed and the sodium compound is converted directly into the amide.

In another method the oxidized wax or fraction thereof is treated with phosphorus trichloride, thionyl chloride, hydrogen chloride, or the like, and the resulting mixture of acid chlorides is treated with aqueous or alcoholic ammonia. In this treatment ammonium chloride and amides are the resulting products. Temperatures in the range of 0° C. to 50° C. are usually used in effecting this latter conversion. Preferably the reaction is carried out at room temperature.

Still another method of producing the amides consists in first esterifying the oxidized wax or fraction with an alcohol, as for example, methyl alcohol, to form the corresponding alkyl esters and the resulting esters are treated with NH₃ to convert them into amides. This ammonolysis can be carried out without a solvent or in alcoholic solution or in solution in other polar organic solvent at temperatures ranging from −10° C. to 300° C. and pressures ranging from 1 to 200 atmospheres. The ammonium halides are especially useful catalysts in the conversion.

Still another method of preparing the amides consists in heating the wax oxidate or fraction thereof with an ammonia genitor, e. g., carbonate, ammonium carbamate, ammonium formate, ammonium acetate, formamide, acetamide or other lower acylamide, to a temperature in the range of 120° C. to 300° C. This reaction results in the liberation of carbon dioxide and water in the case of urea, ammonium carbonate, ammonium carbamate and the like and in the formation of water and formic acid in the case of ammonium formate. With the lower acylamides, the reaction results in the liberation of the corresponding acid in anhydrous form. All of the reaction products other than amides may be removed from the reaction mixture by evaporation or distillation.

The amides prepared by any of the above methods are generally clear dark-brown viscous liquids, substantially insoluble in hydrocarbon solvents such as naphtha, aromatic solvents, e. g., benzene, toluene, xylenes, alcohols and esters, but are soluble in ketones such as acetone, methylethyl ketone and the like. These amides generally have acid numbers in the range of 15 to as high as about 60 mg. KOH/g. and saponification numbers in the range of about 80 to as high as about 250 mg. KOH/g. with corresponding ester numbers between about 20 and 200. Although it is substantially impossible to determine molecular weights of the amide products, on the basis of molecular weights of the acids present in the oxidized wax it is logical to assume that these amides have an average molecular weight above about 250.

As indicated hereabove the amides produced from the water-insoluble, naphtha-insoluble fraction of oxidized paraffin wax are liquid or fluid whereas previously known amides are solid, generally crystalline materials. It is believed that the fact that the particular mixture of amides described herein is fluid contributes to the desirable properties of adherence, flexibility, water-insolubility and insolubility in organic solvents of the films, both of the surface coating type and of the laminate type of resins of this invention.

As employed herein, the term "acid number" is the numerical value of the acidity expressed in milligrams of KOH per gram of substance and is determined by the method described in A. S. T. M. Standards on Petroleum Products and Lubricants, October 1947, page 639. The term "saponification number" as used herein is the saponification equivalent expressed in milligrams of KOH per gram of substance as determined by the method described in the A. S. T. M. Standards, above cited. The term "ester number" is the numerical difference between the saponification number and the acid number and is expressed in the same units.

By the term "aldehyde substance" as used herein is meant formaldehyde, acetaldehyde, hexamethylene tetramine, trioxane, paraformaldehyde, monomethylol dimethyl hydantoin, dimethylol urea, dithiobiuret, glyoxal and similar aldehydes and aldehyde genitors. The preferred compounds are the low molecular weight aldehydes, as for example, formaldehyde and acetaldehyde and low molecular weight formaldehyde genitors, as for example, hexamethylene tetramine, trioxane and paraformaldehyde. The amount of aldehyde or aldehyde substance to be employed will be between about 0.1 and about 0.8 part per part of amide.

In carrying out the condensation reaction it is essential that it be effected in the presence of a particular class of monohydric alcohols. The amount of alcohol to be employed will generally be between about 0.5 part and 10 parts by weight per part of amide. Although the alcohol to be employed is preferably isopropyl or normal propyl alcohol or one of the butyl alcohols, as for example, n-butyl, secondary butyl, isobutyl, tertiarybutyl, etc., alcohols, other aliphatic alcohols having from 2 to 8 carbon atoms per molecule may be employed. Thus, ethyl alcohol and the amyl, hexyl, heptyl, and octyl alcohols which may be the normal or branched-chain alcohols are useful and when present during the condensation of the amides with the aldehyde substances produce the desirable resins of this invention. In addition to the above alcohols which are all saturated aliphatic alcohols, the unsaturated aliphatic alcohols of the same carbon atom content may be employed. Thus allyl and the hydrocarbon substituted allyl alcohols in which the hydrocarbon substituent is aliphatic and may contain from 1 to 5 carbon atoms may be employed to give resins of the same or similar types as those produced from the saturated alcohols. The above alcohols are all acyclic alcohols.

As indicated above the condensation reaction is effected in the presence of the alcohol, however, in addition to the alcohol it is sometimes desirable to include 5 to 100% by weight based on the amide of a hydrocarbon solvent, as for example, benzene, toluene, xylene and the like. Moreover, in some instanecs an aromatic fraction of petroleum containing one or more of these aromatic hydrocarbons may be employed.

The condensation reaction is effected at temperatures between about 50° C. and about 160° C., and water formed during the reaction is removed as it is produced. The preferred temperature of reaction is between 65° C. and 115° C.

In effecting the condensation reaction it has been found that the desired condensation takes places when the mixture of amide, aldehyde and alcohol is heated at a temperature of from about 60° C. to about 160° C., preferably under reflux with a water-trap in the reflux line to permit separation and removal of the water produced during the condensation. Reactions in which commercial formalin is used as the aldehyde genitor usually require a longer time to go to completion as the original water of solution in the formalin must also be removed. The time required to obtain the desired condensation varies but it has been found in some cases that approximately 20 minutes suffice to produce the A stage resin and in other instances the time required has been as long as 5 hours. The end of the reaction is determined by the time at which no further water is removed from the reflux system.

Following the refluxing, a portion or nearly all of the solvent, i. e., the remaining alcohol and/or hydrocarbon solvent may be removed from the A stage resin by evaporation or topping at ordinary or sub-atmospheric pressures. However, generally the alcohol or alcohol and hydrocarbon solvent employed during the condensation will be that solvent in which it is desired to recover the resin for subsequent use. Moreover, the amount of alcohol or other solvent employed during the condensation is preferably the amount which will produce a solution of resin suitable for application to surfaces, i. e., for use as a varnish, enamel, paint, etc.

Although in the description it is stated that the amide is condensed with aldehyde in the presence of alcohol it is believed that the alcohol enters into the condensation reaction and thus is one of the reactants since the resins produced have solubility characteristics differing markedly from resins produced in the absence of such alcohols. Generally an excess of alcohol is employed and the unreacted alcohol serves as a solvent for the resin produced.

In those instances in which part or nearly all of the solvent is removed in order to produce a resin in a solvent mixture having specific characteristics, such solvent may be added to the almost solvent free A stage resin to produce a clear solution. Solvents which may be added for this purpose include the usual varnish, enamel and paint thinners, as well as low molecular weight esters, as for example, ethyl acetate, low molecular weight ketones, as for example, acetone, methyl ethyl ketone and the like, as well as turpentine, aromatics, aromatic petroleum solvents and similar thinners. Moreover, this resin solution is compatible with drying oils, as for example, linseed oil, polymeric linseed oil, tung oil, oiticica oil, perilla oil, dehydrated castor oil and the like.

It was stated hereinabove that most or almost all of the solvent could be removed from the A stage resin without affecting the solubility of the resin in solvents. It has been found that it is substantially impossible to remove all of the solvent, i. e., alcohol, aromatic solvent, etc., from the A stage resin without converting the A stage resin into a B stage resin, in which latter stage the resin or condensation product is substantially insoluble in aromatic hydrocarbon solvents though still somewhat soluble in high solvency liquids, such as acetone, methyl ethyl ketone, butanol and mixtures of such solvents. Thus, in order to convert the A stage resin to a B stage resin it is necessary only to evaporate the solvent substantially completely from the A stage resin. During the final stages of evaporation, it is observed that the liquid changes rapidly in viscosity during the final stages of evaporation to produce a resin varying from a soft, sticky material to a very heavy, sticky fluid. It is this material which is referred to herein as the B stage resin and further it is this material which is found to be an exceptionally outstanding adhesive. Methods of using this B stage resin as an adhesive are described and these products are characterized and evaluated in the data set forth in the examples set forth hereinbelow. The A stage resin can be used as an adhesive, but the particular value of the B stage resin is in plywood preparation where the A stage resins penetrate the wood and require multiple coatings with intermediate drying to give a tight bond. The B stage resin does not penetrate the wood to any large extent and a thin coating is adequate to give a good glue line.

The A stage resins produced as described hereinabove in solution in solvent may be applied to surfaces as by brush, spraying, dipping and the like, without further modification and upon oven drying in an ordinary heated oven or by the use of infrared heaters or the like, to produce the tenacious, flexible films described. The solutions of A stage resin may be colored with the use of alcohol-soluble dyes to produce colored semi-transparent coatings when applied and dried. Moreover, the solutions of A stage resins may be converted into coating materials known in the trade as enamels, paint and the like, by incorporating inorganic fillers and pigments as is well known in the art.

Although the solvent solutions of A stage resins described hereabove will produce the desired films and coatings without further treatment or without the incorporation of catalytic agents, accelerators and the like, it is desirable, in order to reduce curing or baking time following application to surfaces, to incorporate between about 0.05% and about 1% by weight of an accelerator. Accelerators which aid curing of resins of the varnish and enamel base type are well known. Although it is found that acid type accelerators are effective, the most effective ones which have been found include preferably phosphoric acid, sulfuric acid and the like, although other acid accelerators, such as the various sulfonic acids, sulfamic acids, acid phosphate esters and like compounds produce rapid curing. It is believed that further description of these accelerators is not necessary in view of the fact that accelerators of this class are well known.

In converting the A stage resins of this invention to the B stage resins care must be exercised in order to avoid conversion of the B stage into a hard, completely insoluble mass which may be referred to as a C stage resin. Generally, in removing the solvent from the A stage resins it is observed that toward the end of the distillation the rate of solvent removal decreases rapidly. As this decreased rate is observed there is also observed a rapid increase in the temperature of the mass being distilled and a corresponding rapid increase in viscosity. The temperature at which these phenomena occur is different for each type of alcohol modified resin and for each solvent. The decrease in rate of distillation is observed first and conversion to the C stage resin can be prevented or avoided by cooling at this time. However, a certain amount of heating can be continued until the desired increase in viscosity is observed and at this point the product may then be cooled to preserve the B stage resin. The conversion of the A stage resin to the B stage and the conversion of this to the C stage, although not easily described, is readily seen by an operator and easily reproduced. Viscosity increase, for example, is most easily observed by dipping a thermometer or spatula in the resin mass and observing the rate of dropping from the spatula, etc. In changing from an A stage resin to a B stage resin the material has the appearance of changing from an oily, viscous liquid to a stringy mass or a mass which threads as it falls from a spatula. On cooling the B stage resin to room temperature, there is obtained a slightly rubbery, spreadable, somewhat gelled mass which may be described as being very sticky or tacky. This mass remains stable on standing at ordinary temperatures for at least several months.

The following examples will serve to illustrate certain forms and modifications of the invention, including the preparation of acids suitable for use in preparing the amides, methods of amidation, i. e., preparing the amides themselves, and methods of producing resins by condensing amides with aldehydes or aldehyde substances described herein in the presence of the described alcohols. The examples show also the production and characteristics of typical varnish resins and adhesives of this invention. It is to be understood that variations in the procedures involved and in the compositions may be made by one skilled in the art without departing from the basic principles of the invention and for this reason the examples presented are not to be taken as limiting the invention to the particular methods and compositions described.

EXAMPLE I

Acids suitable for use in the preparation of amides useful in preparing the resins of this invention have been prepared by the following process. About 8600 parts by weight of a refined petroleum wax having a melting point of 63° C. were introduced into an oxidation vessel provided with heating and cooling coils and with means for introducing and dispersing air at a point near the bottom of the vessel. The wax was heated to about 130° C. at a pressure of 100 p. s. i. gage. Air was introduced into the oxidation vessel at a rate of 5.5 cu. ft./barrel/minute. After about 20 hours the oxidation reaction had begun to progress satisfactorily and the temperature was decreased to about 125° C. and the temperature was maintained at this point during the remainder of the reaction. Air blowing was continued until the acid number of the wax being oxidized was approximately 265 mg. KOH/g. The product was removed from the oxidation vessel and found to have a saponification number of 485, an acid number of 266 and a saponification number-acid number ratio of 1.8. This product, which amounted to 9000 parts by weight, will be referred to herein as product A.

A small proportion of product A was reserved for use in subsequent experimental work and the major portion, about 8500 parts, was washed with two 10-volume portions of water at about 100° C. After settling and removal of the aqueous phase there remained 5800 parts by weight of the water-insoluble fraction of wax oxidate. This product, which will be referred to as product B, and an acid number of 160, a saponification number of 300 and a saponification number-acid number ratio of 1.85.

About 4000 parts by weight of product B was extracted with two 3-volume portions of a light petroleum naphtha having a boiling range of 50° C. to 85° C. After separation of the naphtha phase the insoluble phase was heated to 120° C. to evaporate the dissolved naphtha. The resulting naphtha-insoluble fraction amounted to 2620 parts by weight, corresponding to a yield of 66% based on product B. This water-insoluble, naphtha-insoluble fraction, which will be referred to as produce C, had an acid number of 169, a saponification number of 345 and a saponification number-acid number ratio of 1.75. Analysis of this product indicated a total oxygen to carboxyl oxygen ratio of about 1.5.

About 1000 parts by weight of product B was subjected to borax extraction as described herein. This amount of the water-washed wax oxidate was mixed with 1650 parts by weight of an aqueous solution of sodium borate containing 9.1% by weight of the borax. The mixture thus formed was extracted three times with 1500 parts by weight of a petroleum naphtha at a temperature of 70° C. and the resulting hydrocarbon and aqueous phases separated. The aqueous phase containing the borate complex was heated to 95° C. to evaporate dissolved naphtha and then acidified with 69.5 parts by weight of 42% sulfuric acid. The acid was added slowly with agitation to prevent local over-heating. The separated acid fraction was water-washed to remove inorganic salts and acids.

The naphtha phase obtained in the above extraction step was further extracted with 192 parts by weight of a 13% by weight solution of sodium borate in water at a temperature of 70° C. in order to remove small amounts of acids capable of forming borate complexes which were retained in the naphtha during the original extraction. The aqueous borate complex phase was separated, acidified and water-washed as above to obtain additional acids. These acids were combined with the acids obtained in the initial borax extraction step and the combined products will be referred to hereinafter as product D. This product has an acid number of 195, a saponification number of 320 and a saponification number-acid number ratio of 1.7 and amounts to 58% by weight of the original product B. Extraction of this fraction with light petroleum naphtha fails to dissolve any acidic material, showing that acids separated in this manner are naphtha-insoluble.

EXAMPLE II

*Direct amidation of naphtha-insoluble fraction of oxidized wax*

A series of five experiments was carried out in which product C was directly treated with ammonia to produce amides and, for comparison, in a sixth experiment a sample of alpha-hydroxy decanoic acid was converted into the corresponding amide by the same procedure. In carrying out these experiments a portion of the acid mixture was heated to a temperature within the range of 80° C. to 220° C. and a stream of ammonia was passed into the heated mixture as rapidly as it could be absorbed. The temperature was gradually increased during the blowing with ammonia to within the range of 150° C. to 240° C. and this temperature maintained and blowing with ammonia continued until no further quantities of water were evolved. Depending on the batch size, ammonia flow rate, and temperature, the time required for this reaction to occur was between about 0.5 and 48 hours. The results of the various experiments are presented below. In each case, with the exception of the alpha-hydroxy decanamide which was a white crystalline compound and was purified by recrystallization from methanol before analysis, the products were clear dark-brown viscous liquids substantially insoluble in hydrocarbon solvents, alcohols and esters and almost completely soluble in acetone.

TABLE 1

| | Naphtha-Insoluble Acids (Product C) | | | | | Alpha-Hydroxy Decanoic Acid |
|---|---|---|---|---|---|---|
| Experiment No | 1 | 2 | 3ᵃ | 4ᵃ | 5 | 6 |
| Final Reaction Temp., °C | 210 | 180 | 205 | 205 | 180 | 154 |
| Time, hours | 4 | 17 | 2 | 7 | 16 | 7 |
| Acid No., mg. KOH/g | 28 | 46 | 43 | 27 | 52 | 0 |
| Saponification No., mg. KOH/g | 85 | 216 | 179 | 146 | 235 | 0 |
| Ester No., mg. KOH/g | 57 | 170 | 136 | 119 | 183 | 0 |
| Nitrogen, Percent: | | | | | | |
| Dumas (Total) | 5.36 | | 4.83 | 4.46 | 3.2 | 7.6 |
| Kjeldahl (Total) | | 6.2 | | | | 7.6 |
| Van Slyke (Amino) | 1.0 | | 1.2 | 1.2 | | 0 |

ᵃ The starting materials for Experiments 3 and 4 were obtained from product C by dissolving a portion of product C in acetone and adding hexane in increments until approximately 50% of the original product C had been rejected. The rejected material was used in Experiment 3 and the more soluble fraction, after removal of solvents, was used in Experiment 4.

EXAMPLE III

*Direct ammonolysis of esters without solvent*

A methyl ester was prepared by refluxing a mixture of 150 parts naphtha-insoluble acids (product C), 300 parts methanol and 1 part sulfuric acid for 4 hours. The solution was cooled, diluted with 900 parts of water and extracted twice with 200 parts of ethyl ether. The combined ether extracts were washed several times with water until neutral, dried over anhydrous sodium sulfate, filtered, and the solvent removed by distillation. The yield of crude methyl ester was about 140 parts.

The methyl esters produced as above were divided, a one-third portion being retained without modification. The remaining material was fractionated by extraction three times with 4 volumes of pentane. The extract and raffinate phases were then distilled to remove solvent. The original preparation and fractions were characterized as follows:

| | Pentane-Soluble Esters | Pentane-Insoluble Esters | Combined Crude Esters |
|---|---|---|---|
| Recovery | 48% | 52% | |
| Appearance | Light orange-brown fluid oil. | Very dark-brown viscous oil. | Dark-brown waxy oil. |
| Acid No | 5.7 | 31.6 | 15.9 |
| Saponification No | 250 | 254 | 257. |

Each of these methyl esters were subjected to direct ammonolysis by a technique directly comparable to that used in Example II for amidation of the acids. The results of tests on the ammonolysis products of these three experiments, together with reaction temperatures and times, are shown in the following table. The pentane-soluble esters were used in Experiment 1, the pentane-insoluble esters were used in Experiment 2 and the crude esters in Experiment 3.

TABLE 2

| | Amides from Methyl Esters of Naphtha-Insoluble Acids | | |
|---|---|---|---|
| Experiment No | 1 | 2 | 3 |
| Final Reaction Temperature, °C | 174 | 180 | 250 |
| Time, hours | 14 | 6 | 2 |
| Acid No., mg. KOH/g | 16 | 22 | 11 |
| Saponification No., mg. KOH/g | 204 | 251 | 159 |
| Ester No., mg. KOH/g | 188 | 229 | 148 |
| Nitrogen, Percent Dumas (total) | 3.45 | 3.14 | 4.24 |

Each of the above products is similar to the products of Example II in regard to physical characteristics. The product of Experiment 1 is somewhat more fluid than that of Experiment 3 and the product of Experiment 2 is extremely viscous.

EXAMPLE IV

*Ammonolysis of esters in solvent at low temperature*

Esters were prepared by reacting 3 liters of methanol, 500 grams of product C from Example I and 2 grams of concentrated sulfuric acid. This mixture was permitted to stand at 25° C. until the acid number of the product reached a constant value. This required 48 hours. At this time the product was saturated with ammonia at room temperature and allowed to stand for 10 days. At this time the solvent was distilled and completely removed by vacuum stripping at 150° C. and 5 mm. pressure. The yield was 464 grams of a dark-brown very viscous liquid.

TABLE 3

|  | Amides from Methyl Esters of Naphtha-Insoluble Acids |
|---|---|
| Acid No., mg. KOH/g | 34 |
| Saponification No., mg. KOH/g | 250 |
| Ester No., mg. KOH/g | 116 |
| Nitrogen, percent: | |
| Kjeldahl (total) | 4.9 |
| Van Slyke (Amino) | 0.7 |

EXAMPLE V

*Amidation with urea*

A mixture of 21 parts by weight of urea and 100 parts by weight of product C from Example I (approximately 0.6 mol urea per carboxyl group) was heated at 160° C. for 6 hours. At the end of this time the product was poured into water and washed to remove unreacted urea and other water-soluble products. Approximately 76 parts of water-insoluble product was recovered.

The water-washed product was found to be only partially soluble in acetone. Extraction with acetone gave one fraction amounting to about 44 parts of acetone-soluble amides, the remaining 32 parts being insoluble in acetone. Analysis of the soluble and insoluble fractions after removing the acetone by distillation gave the following results:

TABLE 4

|  | Acetone-Soluble Portion | Acetone-Insoluble Portion |
|---|---|---|
| Appearance | Dark red-brown viscous oil. | Dark red-brown tacky resin. |
| Acid No., mg. KOH/g | 47 | 48. |
| Saponification No., mg. KOH/g | 213 | 212. |
| Ester No., mg. KOH/g | 166 | 164. |
| Nitrogen, Percent Dumas (total) | 4.45 | 5.06. |

EXAMPLE VI

An A stage resin was prepared by heating the following mixture of materials in a 3-neck flask equipped with a stirrer, thermometer and reflux condenser with a water-trap in the reflux line, 100 g. amide from Example II, Experiment 1
250 ml. n-butanol
150 ml. commercial formalin
100 ml. toluene The mixture was stirred and heated with continuous removal of water over a period of approximately 3 hours, at which time water formation ceased. During this heating, the temperature of the mixture rose to approximately 115° C. The product was a brown fluid varnish-like solution containing approximately 25% resin.

A portion of the product was applied to aluminum foil, using a brush, and the foil placed in an oven at a temperature of 130° C. for 3 hours. The resulting film was hard, dry and adherent and withstood crumpling of the aluminum foil on which it was coated. Moreover, this film, when immersed in water and in various organic solvents for extended periods of time, was found to be completely resistant to the action of such liquids. One piece of the coated aluminum foil was unaffected by immersion in boiling water for 4 hours. The coating did not change in appearance or in its physical characteristics as a result of this treatment.

A portion of the original resin solution was distilled to remove solvent. During this distillation the pot temperature rose to 135° C. At this point a dark brown fairly viscous liquid resulted which contained 36% by weight of solvent and 64% by weight of resin. This resin solution was miscible with and could be thinned with solvents, such as the lower alcohols, aromatic hydrocarbons and the like, and was, therefore, still an A stage resin.

The A stage resin produced as above was converted into a B stage resin by distilling off substantially all of the solvent. A temperature of 145° C. was reached during this treatment. During the final stages of solvent removal, the product became very viscous and the resulting resin was a sticky, dark brown product. When this resin was used as a bonding agent to prepare a Douglas fir plywood panel and the resulting bonded wood oven cured at a temperature of 130° C. for 3 hours, it was found to be impossible to separate the plys at the glued joint without splitting the wood. Moreover, a small panel bonded in this manner was placed in boiling water for 4 hours without reducing the strength of the bonded joint.

EXAMPLE VII

Using the same equipment as described in Example VI, an A stage resin was prepared with the following materials:

200 g. amides, Example II, Experiment 1
134 ml. allyl alcohol
134 ml. commercial formalin
100 ml. toluene
2 g. copper wire The above mixture was stirred, heated and refluxed through the water-trap for 135 minutes. At this time some solvent was removed by distillation to a bottoms temperature of 111° C. The resulting solution was filtered hot to yield 344 grams of a very viscous dark brown liquid with a resin content of 70% by weight. This product was soluble in alcohols, ketones and aromatic hydrocarbons. A varnish was prepared by adding 1.8 volumes of n-butanol per volume of resin solution. This varnish was applied to aluminum foil as in Example VI and the resulting films cured for about 3 hours at a temperature of 130° C. The films produced appeared to be somewhat smoother than those of the product of Example VI but otherwise had the same properties and characteristics of those indicated in that example.

A second varnish was prepared in the same way, except that in this case, 0.1% by weight based on the resin of concentrated sulfuric acid was added to the composition. When this varnish was applied to aluminum foil in a thin film and the coated foil cured for 20 minutes in an oven at 130° C., the resulting film was unaffected by immersion in boiling water for 4 hours and otherwise had the characteristics of the product of Example VI.

EXAMPLE VIII

An A stage resin was prepared following the procedure outlined in Example VI except that lower proportions of butanol and formalin were employed. The ingredients employed were as follows:

200 g. amide, Example II, Experiment 1
150 ml. n-butanol
150 ml. commercial formalin (37% formaldehyde)
100 ml. toluene The condensation was effected under the same conditions as those described in Example VI. However, in this case the product was distilled to a temperature of 132° C. to remove part of the solvent. The resin content of the final product was 71.1%. Varnish prepared from this resin solution by adding 1.85 parts of toluene per part of resin solution required 4½ hours to cure in the form of films on aluminum foil surfaces and these films were softened somewhat by boiling water. However, other characteristics were similar to those of the product of Example VI.

The above preparation was repeated using 100 ml. of acetaldehyde, in place of the 150 ml. of formalin, and 200 ml. of n-butanol. The initial resin solution, without removal of solvent, produced excellent films on curing for 3 hours at 130° C.

EXAMPLE IX

An A stage resin was prepared with the methyl alcohol for purposes of comparison with the other alcohols described herein. The ingredients were the same as those described in the preceding example except that 150 ml. of methanol was substituted for the n-butanol. In this case a final distillation temperature of 150° C. was used and the resulting product was found to contain 72.9% resin. Although this resin was soluble in ketones and alcohols, it was not soluble in aromatic hydrocarbons and therefore was not satisfactory as a varnish resin.

EXAMPLE X

The process of Example VIII was repeated substituting 185 ml. of secondary butanol for the n-butanol used in that experiment. A final distillation temperature, following condensation, of 125° C. was employed and the resulting solution of resin was found to contain 71.7% of the resin. This product was soluble in alcohols, ketones and mixtures of alcohol and benzene. Films produced from this resin when oven cured at 130° C. for 3 hours had the properties of those described in Example VI.

EXAMPLE XI

Example VI was repeated using isopropyl alcohol in place of n-butanol. In this case the final product was distilled to a temperature of 125° C. and the resulting product had a resin content of approximately 70%. When this resin was applied to aluminum foil and cured in the manner described in Example VI, the film had all of the properties indicated for the products of that example.

EXAMPLE XII

An A stage resin was prepared by heating and refluxing the following materials:

200 g. amide, Example II, Experiment 1
150 ml. n-octanol
200 ml. formalin
150 ml. xylenes, mixed Refluxing was continued for approximately 3½ hours when the production of water ceased. This product without evaporation of solvent was applied to aluminum foil and cured in an oven at 130° C. for 3 hours. The resulting cured film was not as hard as the films obtained with the lower molecular weight alcohols but it was smooth, tough and very adherent. It was not affected by boiling water or organic solvents.

To a second portion of the resin solution was added 0.1% by weight based on the resin of concentrated sulfuric acid as an accelerator. This product was then applied to aluminum foil and cured in the manner described above for 30 minutes. The resin film was somewhat harder than that obtained without the use of an accelerator but had all of the other properties of the film produced as above.

A third portion of the resin solution was mixed with 0.1% by weight of p-toluene sulfonic acid. The film produced from this varnish after curing was similar to that obtained with the varnish containing the sulfuric acid accelerator.

EXAMPLE XIII

A B stage resin was prepared following the procedure outlined in Example VI and subsequently distilling the product at ordinary temperatures to 185° C. At this point substantially all of the solvent had apparently been removed. On cooling, the resulting resin was a sticky, slightly fluid material only slightly soluble in acetone and in n-butanol.

A similar B stage resin was obtained by vacuum distillation of the A stage resin solution at approximately 5 mm. pressure. In this case the distillation was stopped at a temperature of 119° C.

EXAMPLE XIV

A B stage resin was prepared following the procedure outlined in Example VII and then distilling the A stage resin solution thus obtained to remove solvent. Heating was discontinued at 130° C. The product, after removing the copper wire inhibitor, was similar to that of Example XIII.

EXAMPLE XV

B stage resins produced in Examples XIII and XIV were tested as adhesives according to the following procedures.

Blocks measuring 1.5 inches by 1.5 inches cut from commercial exterior grade Douglas fir plywood were glued together with grain directions crossed and with a 0.5 inch lap. The resins were spread in a thin film on one block over the area to be glued and another block clamped to the coated block. The clamped assemblies were oven cured at 130° C. for 3 hours, removed from the oven and cooled. Very strong joints were obtained. In fact, when sufficient force was employed to break these assemblies, the break occurred in the wood and not in the glued juncture. Shorter cure times were found not to be as effective and longer cure times, up to 48 hours, had little or no effect on the strength of the joints.

Other plywood assemblies, prepared as above described, were placed in boiling water for 4 hours. Ply separation occurred at the commercial phenolic resin glue line but at that time the bonds made with the resins of this invention were still strong. This same result was obtained on specimens subjected to live steam for extended periods.

Extremely strong joints were also obtained using similar techniques by using the resins of the two preceding examples to laminate glass, stainless steel and aluminum. Moreover, the resins were used to bond glass to stainless steel and to aluminum with the same result. In the case of glass, when sufficient force was applied in an attempt to separate or fracture the bond, it was found that the glass broke without breaking the glue joint.

Tests corresponding to those carried out hereinabove were made on the resins of Examples XIII and XIV to which small amounts of phosphoric acid or sulfuric acid had been added as an accelerator. Thus, when 0.05 part of phosphoric acid was added to the resin of Example XIV and this product used to laminate plywood in the manner described, a cure time of 1½ to 2 hours appeared to be sufficient to obtain maximum bonding strength.

The foregoing examples are illustrative of the invention but are not to be taken as limiting since variations may be made by those skilled in the art without departing from the spirit or the scope of the following claims.

I claim:

1. A resin composition prepared by reacting a fluid amide, an aldehyde substance and an alcohol at a temperature between about 50° C. and about 150° C., said alcohol being an acyclic monohydroxy alcohol having 2 to 8 carbon atoms per molecule and said fluid amide being a mixture of amides prepared by oxidizing paraffin wax with a gas containing free oxygen at a temperature between 100° C. and 140° C. to produce an oxidized wax having an acid number between about 200 and about 350 mg. KOH/g., separating from the oxidized wax a fraction insoluble in water and in petroleum naphtha, which fraction has a saponification number-acid number ratio between 1.4 and 2.2 to 1 and a total oxygen-carboxyl ratio between 1.2 and 1.8 to 1, and amidating said fraction.

2. A resin composition prepared by reacting, at a temperature between about 50° C. and about 150° C., 1 part by weight of a fluid amide with between 0.1 and 0.8 part by weight of an aldehyde substance and between 0.5 and 10 parts by weight of an acyclic monohydroxy alcohol having 2 to 8 carbon atoms per molecule, said fluid amide being a mixture of amides prepared by oxidizing paraffin wax with a gas containing free oxygen at a temperature between 100° C. and 140° C. to produce an oxidized wax having an acid number between about 200 and about 350 mg. KOH/g., separating from the oxidized wax a fraction insoluble in water and in petroleum naphtha, which fraction has a saponification number-acid number ratio between 1.4 and 2.2 to 1 and a total oxygen-carboxyl oxygen ratio between 1.2 and 1.8 to 1, and amidating said fraction.

3. A resin composition prepared by reacting, at a temperature between about 65° C. and about 115° C., 1 part by weight of a fluid amide with between 0.1 and 0.8 part by weight of an aldehyde substance selected from the class consisting of formaldehyde, acetaldehyde, and formaldehyde genitors, and between 0.5 and 10 parts by weight of an acyclic monohydroxy alcohol having 2 to 8 carbon atoms per molecule and removing water as it is formed, said fluid amide being a mixture of amides prepared by oxidizing paraffin wax with a gas containing free oxygen at a temperature between 100° C. and 140° C. to produce an oxidized wax having an acid number between about 200 and about 350 mg. KOH/g., separating from the oxidized wax a fraction insoluble in water and in petroleum naphtha, which fraction has a saponification number-acid number ratio between 1.4 and 2.2 to 1 and a total oxygen-carboxyl oxygen ratio between 1.2 and 1.8 to 1 and amidating said fraction.

4. A resin composition as in claim 3 in which said alcohol is a saturated aliphatic monohydroxy alcohol.

5. A resin composition as in claim 3 in which said alcohol is an unsaturated aliphatic monohydroxy alcohol.

6. A resin composition as in claim 3 in which said aldehyde substance is formaldehyde.

7. A resin composition as in claim 3 in which said aldehyde substance is acetaldehyde.

8. A method for the production of a resin composition which comprises reacting at a temperature between 50° C. and 150° C., one part by weight of a fluid amide, between 0.1 and 0.8 part by weight of an aldehyde substance and between 0.5 and 10 parts by weight of an acyclic monohydroxy alcohol having 2 to 8 carbon atoms per molecule and removing water as it is formed, said fluid amide being prepared by oxidizing paraffin wax with a gas containing free oxygen at a temperature between 100° C. and 140° C. to produce an oxidized wax having an acid number between about 200 and about 350 mg. KOH/g., separating from the oxidized wax a fraction insoluble in water and in petroleum naphtha, which fraction has a saponification number-acid number ratio between 1.4 and 2.2 to 1 and a total oxygen-carboxyl oxygen ratio between 1.2 and 1.8 to 1, and amidating said fraction to form a fluid amide.

9. A method for the production of a resin composition which comprises reacting at a temperature between 65° C. and 115° C. one part by weight of a fluid amide with between 0.1 and 0.8 part by weight of an aldehyde substance selected from the class consisting of formaldehyde, acetaldehyde and formaldehyde genitors, and between 0.5 and 10 parts by weight of an acyclic monohydroxy alcohol having 2 to 8 carbon atoms per molecule and removing water as it is formed, said fluid amide being prepared by oxidizing paraffin wax with a gas containing free oxygen at a temperature between 100° C. and 140° C. to produce an oxidized wax having an acid number between about 200 and about 350 mg. KOH/g., separating from the oxidized wax a fraction insoluble in water and in petroleum naphtha, which fraction has a saponification number-acid number ratio between 1.4 and 2.2 to 1 and a total oxygen-carboxyl oxygen ratio between 1.2 and 1.8 to 1, and amidating said fraction to form a fluid amide.

10. A method for the production of a resin composition which comprises reacting at a temperature between 50° C. and 150° C., 1 part by weight of a fluid amide with between 0.1 and 0.8 part by weight of an aldehyde substance and between 0.5 and 10 parts by weight of an acyclic monohydroxy alcohol having 2 to 8 carbon atoms per molecule in the presence of 5% to 100% based on the amide of a hydrocarbon solvent and removing water as it is formed, said fluid amide being prepared by oxidizing paraffin wax with a gas containing free oxygen at a temperature between 100° C. and 140° C. to produce an oxidized wax having an acid number between about 200 and about 350 mg. KOH/g., separating from the oxidized wax a fraction insoluble in water and in petroleum naphtha, which fraction has a saponification number-acid number ratio between 1.4 and 2.2 to 1 and a total oxygen-carboxyl oxygen ratio between 1.2 and 1.8 to 1, and amidating said fraction to form a fluid amide.

11. A method for the production of a resin suitable for use as an adhesive which comprises reacting at a temperature between 50° C. and 150° C., 1 part by weight of said amide with between 0.1 and 0.8 part by weight of an aldehyde substance and between 0.5 and 10 parts by weight of an acyclic monohydroxy alcohol having 2 to 8 carbon atoms per molecule and removing water as it is formed and subsequently volatilizing substantially all of the unreacted alcohol to produce a solvent-free, sticky resin having only slight solubility in varnish solvents, said fluid amide being prepared by oxidizing paraffin wax with a gas containing free oxygen at a temperature between 100° C. and 140° C. to produce an oxidized wax having an acid number between about 200 and about 350 mg. KOH/g,. separating from the oxidized wax a fraction insoluble in water and in petroleum naphtha, which fraction has a saponification number-acid number ratio between 1.4 and 2.2 to 1 and a total oxygen-carboxyl oxygen ratio between 1.2 and 1.8 to 1, and amidating said fraction to form a fluid amide.

12. A method according to claim 9 in which said aldehyde substance is formaldehyde and said alcohol is a saturated aliphatic monohydroxy alcohol containing between 2 and 8 carbon atoms per molecule.

References Cited in the file of this patent

UNITED STATES PATENTS 2,096,181    Jahrstorfer et al. _____ Oct. 19, 1937